United States Patent [19]

Beaty et al.

[11] 3,985,977

[45] Oct. 12, 1976

[54] RECEIVER SYSTEM FOR RECEIVING AUDIO ELECTRICAL SIGNALS

[75] Inventors: David W. Beaty, Mesa; Gerald R. Severson, Scottsdale, both of Ariz.

[73] Assignee: Motorola, Inc., Chicago, Ill.

[22] Filed: Apr. 21, 1975

[21] Appl. No.: 569,645

[52] U.S. Cl. ............................. 179/82; 325/118; 179/107 BC
[51] Int. Cl.² ............................................. H04B 5/00
[58] Field of Search ............ 179/82, 107 R, 107 BC, 179/1 AL; 325/111, 118, 119

[56] References Cited
UNITED STATES PATENTS

| | | | |
|---|---|---|---|
| 2,535,063 | 12/1950 | Halstead | 179/102 |
| 3,125,646 | 3/1964 | Lewis | 179/82 |
| 3,156,787 | 11/1964 | Puharich | 179/107 BC |
| 3,688,052 | 8/1972 | Self | 179/82 |

Primary Examiner—Kathleen H. Claffy
Assistant Examiner—Joseph A. Popek
Attorney, Agent, or Firm—Harry M. Weiss; Michael D. Bingham

[57] ABSTRACT

A receiver system includes means for electromagnetically coupling audio bandwidth information signals from an induction loop to a miniature induction receiver/transducer. The induction loop is shaped to be worn around the neck of a wearer. The receiver/transducer is physically shaped for placement in the mouth of the wearer. In response to the varying magnetic induction field generated by the induction loop, the audio bandwidth information signals are amplified by the receiver and converted into substantially linear mechanical movement by the transducer. The output of the transducer is propagated mechanically, directly to the inner ear mechanism, via the teeth and gums of the wearer whereby the wearer perceives the message content of the audio bandwidth information signals without the use of conventional outer ear mechanism.

16 Claims, 6 Drawing Figures

RECEIVER SYSTEM FOR RECEIVING AUDIO ELECTRICAL SIGNALS

BACKGROUND OF THE INVENTION

This invention relates to covert receiving systems and more particularly to a receiving system that can be readily worn and concealed in the person of the wearer and that enables the user thereof to receive the message content of incoming inaudible audio signals without the awareness of others.

In the field of law enforcement and other areas, there has been a long standing need for an audio communication system to covertly convey voice bandwidth information signals to an individual. In such applications, for obvious reasons, it is important that the communication system be designed to operate covertly, that is, it is capable of receiving incoming message information without emitting sounds or other signals which could be perceived by others and is concealable from the view of others.

Heretofore, a number of serious attempts have been made to meet the need for covert communication. However, not too successfully. For example, according to a prior art system, a miniature receiver has been provided that is designed for placement within the ear cavity of a user. Thus, it is readily noticeable and not concealed from the views of others. According to the prior art, there s also found a miniature receiver mountable in the mouth of individuals by denuding one or more of the teeth and physically connecting the receiver to the exposed nerves in such a manner that received messages are transmitted via nerve conduction so that the user "hears" the message. It is also found that the receiver must be permanently affixed to the exposed nerves of the teeth by orthodontic surgery and can only be removed by the same. The receiver is also fabricated to receive radio frequency (RF) signals directly which requires greater circuit complexity and may be more unreliable than an inductive coupling audio system. The problems and shortcomings of such a system are obvious. It is highly impractical; it subjects the wearer to great inconvenience to say the least. Furthermore, it exposes the wearer to possible injury to his tissue, nerve and gum structure.

Thus, such a system is highly impractical and costly to wear, even after assuming the aforementioned possible injury to the person can be overlooked. Moreover, such a receiver is not capable of receiving incoming inaudible induction coupled audio signals.

Thus, there are a number of problems and shortcomings associated with the prior art; the prior art device is not capable of receiving inaudible audio bandwidth signals. Also the prior art device is not readily concealable. Accordingly, no prior art device has been able to meet the need of the peculiar demand placed on such a covert receiving system. Yet there is a great need and demand for a receiving system capable of enabling the user covert and concealed hearing without generating audible sound.

SUMMARY OF THE INVENTION

Accordingly, it is an object of this invention to provide an improved receiver system for receiving inaudible audio bandwidth electrical signals.

Another object of this invention is to provide a receiving system for enabling the user to receive the incoming messages covertly.

A further object is to provide a receiver apparatus which is physically shaped so that it can be readily concealed into and removed from the mouth of the user.

According to a feature of the invention a receiver system is designed so that the user can conceal it easily and receive the message content of an incoming inaudible audio bandwidth signals in a covert manner. The aforementioned and other objects are met and the aforedescribed shortcomings of the prior art receiving system are overcome in accordance with the present invention, by providing an improved receiver system designed to generate a varying electromagnetic field in response to the incoming inaudible audio bandwidth signals and to convert the electromagnetic field into substantially linear mechanical movement without emitting audible sound. The receiver system is designed so that the linear mechanical movement is of a character and type that the tissue and bone, such as the gum and teeth of the user can propagate and sense therethrough to the inner ear; whereby the user can receive incoming inaudible audio signal covertly.

According to another feature of the invention, the receiver system includes an induction loop or coil and an induction receiver/transducer. The induction loop is preferably designed so that it can be worn around the neck of the user and is adapted to generate a confined varying electromagnetic field in response to incoming signal in audio frequency range. The receiver/transducer is inserted in the mouth of the user such that it can be readily removed from the mouth of the subject. Preferably the mouth-piece receiver may be shaped for ready insertion and removal from between the teeth, gums, and cheek. The mouth-piece receiver/transducer includes an audio amplifier inductively coupled to the induction loop or coil, a readily replaceable power supply battery, and an electromechanical transducer which are encased in a certain physiologically inert polymer type material. Thus, advantageously, in accordance with the present invention, the receiver/transducer responds to receive the electromagnetic field generated by the induction loop or coil and provides substantially a linear mechanical movement which is imparted to the teeth and gum areas of the user. The movement so imparted is then believed to propagate through the gum and bone structure of the wearer to the inner ear. The wearer then "hears" or perceives the message content of the incoming signal without the receiver emanating any audible sound.

According to a further feature of the invention, the polymer type material which encases the receiver/transducer assembly is comprised of an epoxy-resin system including a curing agent of the Amine family. More specifically, unmodified Bisphenol-A resin is proportionally mixed with a curing agent comprised of an eutectic of M-phenylene diamine and Methylene dianaline. The epoxy-resin system is specially step cured to ensure miminal tissue response.

Aforementioned and various other objects, features and advantages of the present invention will become clearer from the following detailed description of an illustrative embodiment of the present invention in conjunction with accompanying drawings.

DETAILED DESCRIPTION OF THE INVENTION

Figure 1:
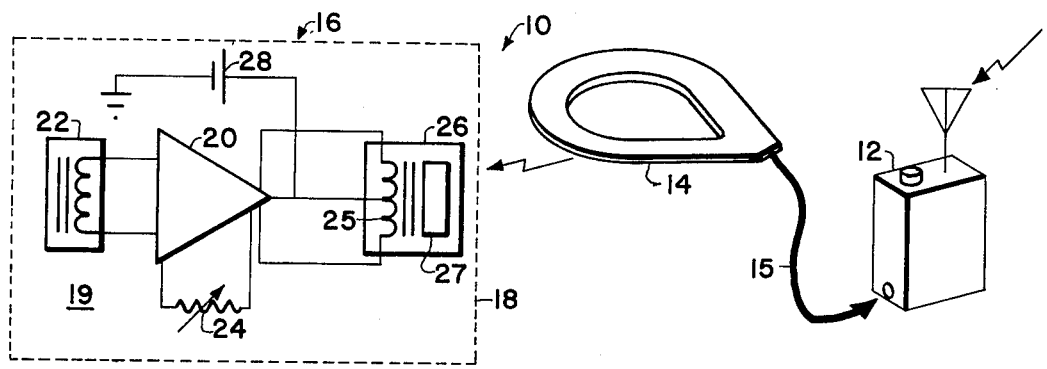
FIG. 1 is a partial schematic and block diagram illustrating the receiver system of the embodiment of the invention.
Figure 3:
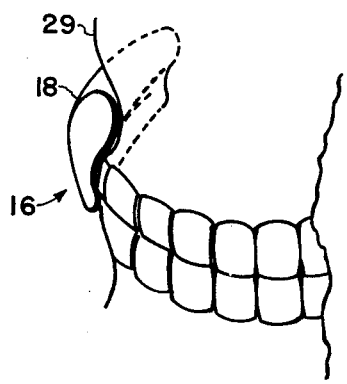
FIG. 3 is a framentary view of a human mouth showing the placement of inventive transducer/receiver in the form of a mouth-piece.

Referring to the Figures, there is shown in a partial block schematic form in FIG. 1, the receiver system of the embodiment of the invention which is designed to enable a person to "heart" inaudible message signals covertly. Receiver system 10 is shown as including an induction loop 14 which may be shaped to be worn about the neck of the intended user. More generally, induction loop 14 may be of any suitable shape and design and can be located preferably in a concealed manner near any suitable audio source for generating a varying magnetic field. Induction loop 14 is magnetically coupled to a receiver/transducer in the form of a mouth-piece 16. As will be explained in greater detail, the receiver mouth-piece 16 comprises a polymeric housing 18 physically shaped to be disposed between the cheek and teeth and gum areas of the mouth of the user as illustrated in FIG. 3. Encapsulated within polymeric housing 18 is a monolithic integrated circuit 19 including audio amplifier 20, and having induction pickup coil 22 designed to sense and receive, inductively, an incoming inaudible audio band signal in the form of a varying magnetic wave from coil 14. The gain of amplifier 20 is made adjustable by gain select resistor 24 and is preset by the manufacturer. The output of amplifier 20 drives miniature electromechanical transducer 26 with bias potential being provided by battery 28 which is also disposed within mouth-piece 16. Electromechanical transducer 26 is illustrated in partial and schematic form and includes coil 25 and transducer mass 27.

Figure 2:
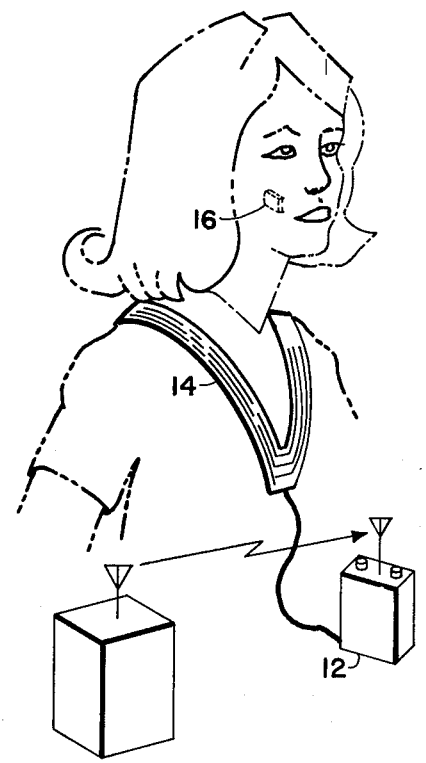
FIG. 2 is a perspective view showing the receiver system of the embodiment of the invention as might be used by a person.

As illustrated in FIG. 2 and FIG. 3, the induction loop 14 is designed to be worn about the neck of the user such that it can be concealed by the outer garments. Mouth receiver 16 is shown as being disposed between the rightside cheek and the teeth and gums 29 of the user. Induction loop 14 is then connected to miniature pocket receiver 12 via cable 15; receiver 12 may be concealed within the clothing of the user and receives a transmitted signal and converts this signal into audible audio bandwidth electrical signals containing audio bandwidth information.

While induction loop 14 is shown in the form of a loop to be worn about the neck of a user, it is to be understood that it could be concealed, for example, about a room in which the user may occupy. It is also to be understood that induction loop 14 can be coupled to any audio source suitable for providing inaudible audio electrical signals and generates a varying magnetic field in response to the inaudible audio electrical signals. Mouth mounted receiver 16 is so disposed within the changing field that a very low voltage is induced across its induction pickup coil 22, preferably of subminiature form. The induced voltage is then applied to the input of audio amplifier 20. The output of audio amplifier 20, which is of a push-pull configuration, drives electromechanical transducer 26. Audio amplifier 20 is designed, in the preferred embodiment, to operate in class B or class A-B modes. The aforementioned modes provide maximum efficiency and linear output characteristics to be realized by audio amplifier 20. As battery 28 is a single cell, 1.5 volt battery, it is very important that audio amplifier 20 requires minimum power drain to prolong the lifetime of the battery.

Electromechanical transducer 26 is mass-loaded against polymeric housing 18 and imparts a substantially linear movement to the entire assembly in response to the electrical signals applied thereto from amplifier 20. A slight flexation of housing 18 is provided so that the housing conforms to the jaw area of the user. However, once closely coupled mechanically to the gum, the amount of pressure exerted on the housing has negligible effect on the performance of the device. The linear movement of polymeric housing 18 imparts mechanical motion to the facial tissue and bone structure of the user in such a manner that this movement is mechanically coupled to the inner ear of the user without any audible sounds being emitted therefrom. Hence, the user receives the audio bandwidth information without the knowledge of any other person who might be in close proximity to him.

One significant advantage provided by the invention over prior art circuits, is that message information may be transmitted to a user of the inventive receiving system, without any other person near the user knowing that the user is receiving the message. The inventive receiving system employs inductive coupling for applying inaudible audio bandwidth signal information to the inner ear of the user. Another significant advantage over the prior art is that a receive mouth-piece is utilized which is readily removed or inserted by the user. This also allows for cleaning and/or replacing battery 28.

Figure 4:
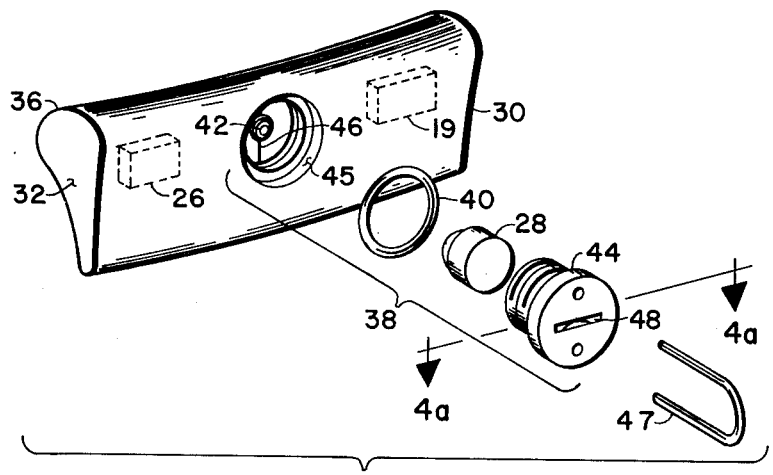
FIG. 4 is a partially exploded perspective view showing a suitable physical shape of the mouth-piece.

Referring now to FIG. 4, there is shown the polymeric housing 18 of mouth-piece receiver 16 in greater detail. As will be explained later, polymeric housing 18 is fabricated of an epoxy resin material composition which is chemically inert to the body chemistry of the user, and has a unique design such that optimum performance of the mouth-piece receiver is developed.

Also of significance, is that the electromagnetic field, generated by induction loop 14 and that is coupled to pickup coil 22, has a confined field area. Hence, it would be essentially impossible for anyone to inadvertently or otherwise receive the message content thereof.

In the course of developing a suitable material which would provide maximum efficiency for imparting mechanical movement in response to the receiver/transducer, clinical analysis was conducted to determine a material compound which is most adaptable to the human physiological system. Several material compositions were found to be acceptable. However, in the preferred embodiment, an epoxy-resin system comprised of an Amine curing agent was determined to be best suited to be chemically inert to the human chemical characteristics while providing efficient coupling from the receiver/transducer to the inner ear mechanism. Polymeric housing 18 is comprised of unmodified Bisphenol-A resin and an eutectic of M-phenylene diamine and Methylene dianaline curing agent. Chemically, 100 pts of the epoxy is proportioned to 20 parts of the curing agent. It is very important that the epoxy-resin system be properly cured to ensure minimal tissue response. The material comprising polymeric housing 18 is step-cured in increments of 50° F starting at 150° F to generally 300° F. The material is cured for two hours at each increment of temperature. The step-curing is very important because if not cured properly, the material will react with the body tissue and fluids causing marked tissue response. Moreover, it is the specific curing process that advantageously enables the particular epoxy-resin system to be used in the human body and not be deleteriously affected by the biological temperature, and chemical reaction taking place in the human body without adversely effecting the body system.

The particular geometry of the device was determined by making orthodontic impressions of the mouths of a representative group of people using silicon rubber, and a special type clay. Thus, a mold was fabricated which is a composite average of all the impressions which were made. The particular geometry of mouth-piece receiver 16 illustrated in FIG. 4 was found to be suitable. In general it is designed such that it can be inserted only on the right side of the mouth and can only be inserted in the correct vertical relation to induction loop 14, as will be explained later. It is understood that if desired the mouth-piece could be formed such that it could be used on the left side of the mouth also. Mouth-piece 16 has a general curve to the structure thereof to facilitate placing of the mouth-piece towards the rear of the mouth, as illustrated in FIG. 3, and the fleshy portion of the cheek area where it may be readily concealed. As illustrated, portion 30 of mouth-piece receiver 16 is made narrower than the portion 32 thereof. Bottom potion 34 is made thinner with respect to top portion 36 which is curved so that the device fits up over the gum area of the mouth and holds mouth-piece receiver 16 in place between the teeth and gum area and the cheek of the user.

In the design and development of mouth-piece receiver 16 the components; audio circuit 19, battery 28, and electromechanical transducer 26 were placed at proper location for optimum performance of the mouth-piece receiver 16. As illustrated in FIG. 4, in one illustrative embodiment, electrical amplifier 19 is positioned in the extreme front end portion of mouth-piece receiver 16 so that induction pickup coil 22 is physically located at the closest possible proximity to induction loop 14, which in most applications, is worn about the neck of the user. Preferably, the induction pickup coil 22 of audio circuit 19 is positioned vertically so that it is placed in the plane of direct coupling to induction loop 14 and functions electrically as a secondary of a loosely coupled transformers; this allows the electromagnetic energy from induction loop 14 to be coupled directly thereto. Audio circuit 19 that includes induction pickup coil 22 and audio amplifier 20 is precoated with a suitable silicone buffer material to isolate the electronics from the thermal expansion and contraction of the aforementioned epoxy resin system of polymeric housing 18 which would otherwise tend to destroy the electronic circuitry and change the resonant frequencies of mouth-piece receiver 16 over temperature excursions which normally occur within the mouth of the user.

Battery 28 and battery compartment 38, which comprises cover assembly 44 and housing assembly 45, being the heaviest of the components of mouth receiver 16, are placed in the physical center of mouth-piece receiver 16 such that when excited by the mass of electromechanical transducer 26, mouth-piece receiver 16 moves in a somewhat rotating fashion about the center axis point as determined by battery 28 and battery compartment 38. The aforementioned potting of the audio circuit 19 provides the additional mass or weight necessary to offset and balance the entire mouth-piece receiver 16, in relationship to electromechanical transducer 26, to make the motion of mouth-piece receiver 16 substantially linear.

Battery 28, being of the commercially available single cell, silver oxide type battery, could generate toxic fluids if leakage were to occur therefrom. Therefore, careful consideration was made during the design of battery compartment 38 to protect the user from any such toxic material and for preventing fluids from entering the battery compartment which might react with the battery 28 and with associated electrical contacts 46. Battery compartment 38 is made from a type 302 stainless steel which is important, as opposed to other stainless steels, in that this particular type is substantially inert to the body chemistry of the user. To prevent saliva from entering battery compartment 38, the compartment is fabricated to include fluoro-silicone O-ring 40 as a moisture seal. Fluoro-silicone is used as it is compatible with the human body and with type 302 stainless steel material.

Battery compartment 38 may be fabricated in such a small space by utilizing a specially designed raised archimedes spiral spring 42 which compresses within itself to a maximum thickness of the wire itself, which is approximately ten thousands of an inch. The beryllium copper spring 42 was hand fabricated on a special form and then heat treated and gold plated for greater conductivity.

Figure 4A:
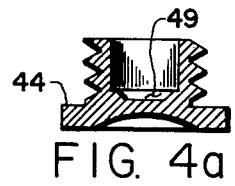
FIG. 4a is a cross sectional view of a battery housing cover substantially taken in the direction of arrows 4-4a of FIG. 4.

Referring to FIG. 4a, in the event that the user might possibly put the battery in reverse and destroy both the battery and/or the electronics, cover assembly 44 of battery housing 38 is fabricated with recessed cavity 49. In event battery 28 is reversed the negative button terminal thereof cannot make contact with housing assembly 44 because of the recess in its base. Contact to spring 42 (the negative battery terminal) in the bottom of battery compartment 38 is made by means of a copper strap 46 recessed in a trough in polymeric housing 18 thereby preventing accidental shorting to audio amplifier circuit 19 and using a minimum of physical space. The positive terminal of battery 28 (battery cover 44) is connected to amplifier circuit 19 by chemically treating stainless steel housing 45 in an isolated area and affixing a small flexible copper pickoff lead by means of high temperature silver bearing solder.

Battery compartment 38 is physically located on the outer circumference of the entire mouth-piece receiver 16 to prevent accidental contact with the gums and teeth of the user to prevent direct metallic contact which might provide physical irration with the intended user. Moreover, battery cover 44 is constructed to be easily removed by either a common paper clip (illustrated as reference number 47) or by inserting a coin into slot 48.

As noted previously, mouth-piece receiver 16 is asymmetrical from one end to the other, the larger portion housing electromechanical transducer 26. Mouth receiver 16 is designed for placement in the back of the jaw area, for example, in the right-hand side of the mouth, so that it is more readily concealed.

Figure 5:
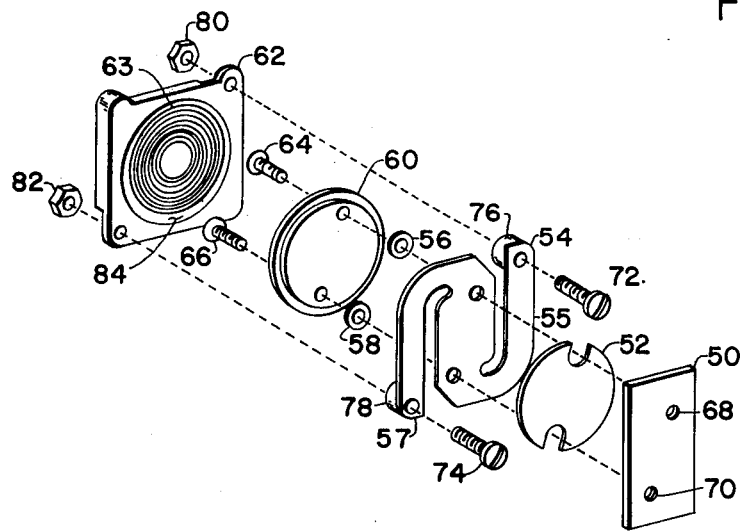
FIG. 5 is an exploded view illustrating the electromechanical transducer of the invention.

Referring now to FIG. 5, there is illustrated a specifically designed novel electromechanical transducer 26. As shown, electromechanical transducer 26 includes: brass mounting plate 50, fiberglass washer 52, specially designed and spirally configured cantilevered arm 54, spacers 56 and 58, keeper plate 60, and E-core assembly 62.

In the fabrication of electromechanical transducer 26, brass mounting plate 50, fiberglass washer 52, cantilevered arm 54, spacers 56 and 58, and keeper plate 60 are assembled together in one assembly using screws 64 and 66 which are inserted through the assembly into threaded holes 68 and 70 of brass mounting plate 50. E-core assembly 62 then is affixed to cantilevered arm 54 by mounting screws 72 and 74 inserted through the end openings 76 and 78 through E-core assembly 62 and attached by locked nuts 80 and 82. Electromechanical transducer 26 is then mechanically and rigidly bonded to polymeric housing 18. The bond is made between the surface of brass mounting plate 50 and the inside surface of polymeric housing 18.

Fiber spacer 52 is included between cantilevered arm 54 and brass mounting plate 50 to provide mechanical clearance therebetween. This prevents mechanical bottoming of the moving assembly. Moreover, keeper plate 60 is of low remenence high permeability material for increasing the efficiency of the total electromechanical transducer. Spacers 56 and 58 provide critical gap spacing between keeper plate 60 and cantilevered arm assembly 54. To provide for mechanical tolerances of the individual components employed, the aforementioned gap spacing is allowed to vary between 3 5/1000 of an inch. As the gap spacing is decreased, electromechanical transducer 26 becomes more efficient. However, with narrower spacing electromechanical transducer 26 will not be able to handle high amplitude signals as might be experienced in actual usage. Therefore, a compromise is obtained for typical listening levels. Thus, some compromise in efficiency is allowed in order to provide the capability of the audio circuit 19 to drive to its maximum output level so that mouthpiece receiver 16 can be employed in high noise environments.

In operation, in response to the electrical signals, which are applied to coil windings 63, from audio amplifier 20, electromagnetic fields are generated in E-core assembly 62 of the polarity which cause the assembly to be attracted to or repelled by keeper plate 60. Hence, E-core assembly 62 moves freely within polymeric housing 18. To mass-couple this motion linearly to polymeric housing 18, cantilevered arm 54 is attached to E-core assembly 62.

Cantilevered arm 54 has spirally configured arms 55 and 57, which provide larger and more effective focal arms in a much greatly reduced physical space. Hence, electromechanical transducer 26 has a very low frequency response not normally found in conventional prior art. Being spirally configured, arms 55 and 57 are mechanically opposed to develop substantially linear movement which is imparted to polymeric housing 18. This linear mechanical movement is not provided by conventional electromechaical transducers which employ a single cantilever arm and wherein the movement thereof is essentially non-linear.

Conventional electromechanical transducers used in the hearing aid art were also found as being incapable of responding to high peak currents as otherwise required to effectively drive the polymeric housing of the invention. To be compatible with micro-miniature monolithic integrated amplifier 20 wherein maximum electrical efficiency is obtained from single battery 28, E-core assembly 62 comprises a magnetic cup core 84 fashioned in an E-configuration so that a maximum amount of wire for the coil may be disposed therein for generating a maximum electromagnetic field. By using bifilar windings of No. 44 AWG wire, a substantially large amount of wire may be placed in the cavity of the E-core. Flexible pigtail leads (not shown) are then brought out from the back of the coil assembly to the printed circuit board assembly of audio amplifier circuit 19 which allows the entire electromechanical transducer to flex freely.

To provide maximum output power, audio amplifier 20 is designed in a push-pull configuration to effectively double the available voltage supplied by battery 28 and to provide adequate output power. Audio amplifier 20 is designed in monolithic integrated form to provide maximum current gain at a minimum bias voltage level applied thereto, as is understood in the art. In order to enhance the low frequency response of the receiver transducer in compensation for the subminiature size of induction pickup coil 22, the audio response of audio amplifier 20 is intentionally boosted on the low end of the frequency range (approximately 1 kilohertz to 500 hertz) by a factor of 6 decibels. Below 500 hertz, the response is dramatically reduced to minimize the interference from undesirable magnetic fields, such as AC power transformers, etc.

As an aside, although the receiver system will function in the presence of any relatively strong electromagnetic field which exhibits the proper frequency response characteristics, induction loop 14 is designed to provide adequate clearance for the head of an average "typical" potential user and has the required number of turns to provide a maximum intensity electromagnetic field and a workably high output impedance for driving audio amplifier circuit 19. The materials choosen for induction loop 14 are selected for maximum comfort for the user while providing a noise-free device in the event of physical movement.

By way of example only, several working units have been fabricated and have the following specifications:

| Mouth Piece Receiver: | | |
|---|---|---|
| Maximum Dimensions | 42L × 16H × 6T | Millimeters |
| Weight (with battery) | 11 | Grams |
| Typical Operating Life (per battery) | 4–10 | Hours |
| Battery Type | One (1) mallory M5212H silver oxide cell, 1.5 volts or one (1) Eveready F212 silver oxide cell, 1.5 volts. | |
| Operating Temperature | 0C° to 70°C | |

What has been described, therefore, is an unique receiving system suitable for providing message information to a user in a covert manner. The receiving system of FIG. 1 is fabricated to be worn by a user in such a manner that he receives the message information without any sound being emitted. Moreover, the receiving system comprises a mouth-piece receiver which is suitable for readily being inserted and removed from the mouth of the user. The user may only be required to be in close proximity to an electromagnetic field containing the audio bandwidth information for inductively coupling to the mouth-piece receiver. In response to the generated electromagnetic field, an audio amplifier circuit couples audio electrical signals to a miniature electromechanical transducer, both of which are included in the mouth-piece receiver, the electromechanical transducer converting the audio electrical signals to a linear mechanical movement which imparts motion via mechanical means to the inner ear of the user such that the message information is received by the user.

Although the particular embodiment of the invention has been described by way of exemplifying the use thereof by a human user, it is to be understood that the inventive receiver system may be used in other applications, for example, such a receiving system could be used for giving covert command instructions to canines. In this environment, it is envisional that a suitable audio source and induction loop could be provided in the collar worn by the animal.

While the above detailed description has shown, described and pointed out the fundamental novel features of the invention as applied to various embodiments, it will be understood that various modifications and changes may be made by those skilled in the art without departing from the spirit of the invention. It is the intention, therefore, to be limited only as indicated by the scope of the following claims.

What is claimed is:

1. A receiver system for receiving audio electrical signals, comprising:
   means external to a subject's mouth for generating a varying electromagnetic field in response to the audio electrical signals; and
   means physically shaped to be easily and removably disposed in the mouth of said subject and being mechanically coupled to the gums for converting said electromagnetic field into mechanical movement to impart motion through said mouth so that said subject perceives the message content of said audio electrical signals.

2. The receiver system in accordance with claim 1, wherein said means for generating a varying electromagnetic field includes an induction loop, said induction loop being physically shaped to be worn around the neck of said subject.

3. The receiver system in accordance with claim 2, wherein said induction loop is suitable to be concealably disposed under the clothing of said subject.

4. The receiver system of claim 1, wherein said converting means includes:
   power supply means for providing an operating bias potential;
   amplifying means operatively coupled to said power supply means and being responsive to said varying electromagnetic field for deriving amplified audio electrical signals at an output terminal thereof;
   electromechanical transducer means operatively coupled to said power supply means to said output terminal of said amplifying means for converting said audio electrical signals from said amplifying means into said mechanical movement; and
   a polymeric housing for encapsulating said amplifying means, said power supply means, and said electromechanical transducer means, said polymeric housing means being physically shaped so that it can be positioned between the teeth, gum area, and the cheek of said subject.

5. The receiver system of claim 4, wherein said amplifying means includes:
   a miniature induction pickup coil for coupling said varying electromagnetic field from said generating means to said audio amplifier, said miniature induction pickup coil converting said varying electromagnetic field into driving voltages and currents; and
   an audio amplifier for developing said audio electrical signals in response to said driving voltages and currents from said pickup coil.

6. The receiver system of claim 5, wherein said audio amplifier operates as a push-pull amplifier.

7. The receiver system of claim 4, wherein said electromechanical transducer means includes;
   said electromechanical transducer means being operatively bonded to said polymeric housing means;
   a moveable E-core assembly coupled to said output terminal of said amplifying means, said audio electrical signals from said amplifying means causing said E-core assembly to have oscillatory motion corresponding to the magnitude and polarity of said audio electrical signals; and
   a cantilevered assembly responsive to said oscillatory motion of said E-core assembly for developing said mechanical movement, said cantilevered assembly being mechanically connected to said E-core assembly.

8. The receiver system of claim 7, wherein said cantilevered assembly includes:
   a low remanence high permeability keeper plate; and
   a cantilevered arm assembly having a pair of spirally configured cantilevered arms for providing said mechanical movement in response to said moveable E-core assembly.

9. The receiver system of claim 8, wherein said cantilevered assembly further includes:
   a pair of spacer washers disposed between said keeper plate and said cantilevered arm assembly;
   a brass plate;
   a fiber spacer disposed between said cantilevered arm assembly and said brass plate for providing mechanical clearance therebetween; and
   said cantilevered assembly being fixedly bonded to said polymeric housing.

10. The receiver system of claim 4, wherein said polymeric housing is an epoxy resin system comprising:
    a Bisphenol-A resin; and
    an eutectic of M-phenylene diamine and methylene dianaline curing agent.

11. The receiver system of claim 4, wherein said electromechanical transducer means includes:
    a moveable E-core assembly coupled to said output terminal of said amplifying means, said audio electrical signals from said audio amplifier, means causing said E-core assembly to have oscillatory motion which corresponds to the magnitude and polarity of said audio electrical signals;
    a low remanence high permeability keeper plate;
    a cantilevered arm assembly having a pair of spirally configured cantilevered arms for providing said mechanical movement in response to said oscillatory movement from said E-core assembly, said cantilevered arm assembly being mechanically connected to said moveable E-core assembly at the outer peripheries of said pair of spirally configured cantilevered arms;

a pair of spacer washers disposed between said keeper plate and said cantilevered arm assembly;

a brass plate;

a fiber spacer disposed between said cantilevered arm assembly and said brass plate for providing mechanical clearance therebetween; and said brass plate being rigidly bonded to said polymeric housing whereby said mechanical movement is imparted to said polymeric housing by said electromechanical transducer means being mass-loaded to said polymeric housing.

12. The receiver system of claim 11, wherein said polymeric housing means includes:

a Bisphenol-A resin; and an eutectic of M-phenylene diamine and methylene dianaline curing agent.

13. The receiver system of claim 4, wherein:

said amplifying means includes a miniature induction pickup coil for developing a driving signal in response to said varying electromagnetic field, and an audio amplifier responsive to said driving signal from said miniature induction pickup coil for developing audio electrical signals at an output terminal thereof; and said electromechanical transducer means being responsive to said audio electrical signals from said audio amplifier for generating said mechanical movement.

14. The receiver system of claim 1, wherein said converting means is configured for placement in the back jaw area of a viable subject whereby said mechanical movement is coupled to the inner ear mechanism of said viable subject via the facial structure of said viable subject including bone conduction thereof.

15. In a receiver system for receiving audio electrical signals whereby a varying electromagnetic field is generated, a miniature receiver suitable to be mounted between the cheek, teeth and gums of a viable subject, said receiver including in combination:

power supply means for providing operating bias potential;

amplifier means for generating audio electrical signals in response to said varying electrical magnetic field, said amplifier means being coupled to said power supply means;

electromechanical transducer means for converting said audio electrical signals applied from said amplifying means to linear mechanical movement; and polymeric housing means for encapsulating said amplifying means, said power supply means, and said electromechanical transducer means, said housing means being physically shaped to be removably disposed within the mouth of a viable subject whereby said linear mechanical movement developed by said electromechanical transducer is mechanically coupled through the facial system of said viable subject in such a manner that said viable subject perceives the message content of said audio electrical signals.

16. The miniature receiver of claim 15, wherein said polymeric housing is an epoxy resin system comprising:

a Bisphenol-A resin;

an eutectic of M-phenylene diamine and methylene dianiline curing agent.

* * * * *